(12) United States Patent
Sabert et al.

(10) Patent No.: US 11,333,825 B2
(45) Date of Patent: May 17, 2022

(54) METHOD OF MANUFACTURE OF A CAPILLARY FOR A HOLLOW-CORE PHOTONIC CRYSTAL FIBER

(71) Applicant: ASML NETHERLANDS B.V., Veldhoven (NL)

(72) Inventors: Hendrik Sabert, London (GB); Paulus Antonius Andreas Teunissen, Eindhoven (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 17/088,201

(22) Filed: Nov. 3, 2020

(65) Prior Publication Data
US 2021/0141150 A1  May 13, 2021

(30) Foreign Application Priority Data

Nov. 7, 2019 (EP) ..................................... 19207624
Dec. 5, 2019 (EP) ..................................... 19213709

(51) Int. Cl.
*C03B 37/012* (2006.01)
*C03C 15/00* (2006.01)
(Continued)

(52) U.S. Cl.
CPC ...... *G02B 6/02328* (2013.01); *C03B 37/0122* (2013.01); *C03C 15/00* (2013.01);
(Continued)

(58) Field of Classification Search
CPC ............ G02B 6/02328; G02B 6/02347; G02B 6/02357; G02B 6/02376
See application file for complete search history.

(56) References Cited

U.S. PATENT DOCUMENTS 6,640,037 B2  10/2003  Gallagher
6,891,997 B2   5/2005  Sercel et al.
(Continued)

FOREIGN PATENT DOCUMENTS

CN  101836143   9/2010
CN  108947232  12/2018
(Continued)

OTHER PUBLICATIONS

Extended European Search Report issued in corresponding European Patent Application No. 20203995.4, dated Mar. 11, 2021.
(Continued)

*Primary Examiner* — Ryan A Lepisto
(74) *Attorney, Agent, or Firm* — Pillsbury Winthrop Shaw Pittman LLP

(57) ABSTRACT

A method for manufacturing a capillary usable as part of a hollow-core photonic crystal fiber. The method includes obtaining a capillary having capillary wall including a first wall thickness; and chemically etching the capillary wall to reduce the wall thickness of the capillary wall. During performance of the etching, a control parameter is locally varied along the length of the capillary, the control parameter relating to reactivity of an etchant used in the etching, so as to control the etched wall thickness of the capillary wall along the capillary length. Also disclosed is a capillary manufactured by such a method and various devices including such a capillary.

20 Claims, 6 Drawing Sheets

(51) Int. Cl.
*C03C 25/68* (2006.01)
*G02B 6/02* (2006.01)

(52) U.S. Cl.
CPC .......... *C03C 25/68* (2013.01); *G02B 6/02347* (2013.01); *G02B 6/02357* (2013.01); *G02B 6/02376* (2013.01); *C03B 2203/16* (2013.01); *C03B 2203/42* (2013.01)

(56) References Cited

U.S. PATENT DOCUMENTS

| | | | |
|---|---|---|---|
| 6,952,253 | B2 | 10/2005 | Lof et al. |
| 6,961,116 | B2 | 11/2005 | Den Boef et al. |
| 7,265,364 | B2 | 9/2007 | Teunissen et al. |
| 7,346,250 | B1 | 3/2008 | Dabich, II et al. |
| 7,419,308 | B2 | 9/2008 | Ma |
| 7,646,471 | B2 | 1/2010 | Teunissen et al. |
| 8,306,379 | B2 | 11/2012 | Benabid et al. |
| 9,088,074 | B2 | 7/2015 | Heiks et al. |
| 9,160,137 | B1 | 10/2015 | Abdolvand et al. |
| 9,658,393 | B2 * | 5/2017 | Digiovanni ....... C03B 37/01217 |
| 10,527,782 | B2 * | 1/2020 | Lyngsoe ............. C03B 37/0122 |
| 2002/0150367 | A1 | 10/2002 | Gallagher |
| 2004/0175085 | A1 | 9/2004 | Forbes et al. |
| 2005/0232560 | A1 * | 10/2005 | Knight ................ C03B 37/0124 385/125 |
| 2007/0296960 | A1 | 12/2007 | Den Boef et al. |
| 2008/0198380 | A1 | 8/2008 | Straaijer et al. |
| 2009/0168062 | A1 | 7/2009 | Straaijer et al. |
| 2010/0007863 | A1 | 1/2010 | Jordanoska |
| 2010/0233600 | A1 | 9/2010 | Den Boef et al. |
| 2010/0328655 | A1 | 12/2010 | Den Boef |
| 2010/0328658 | A1 | 12/2010 | Benabid et al. |
| 2011/0026032 | A1 | 2/2011 | Den Boef et al. |
| 2011/0032500 | A1 | 2/2011 | Straaijer |
| 2011/0102753 | A1 | 5/2011 | Van De Kerkhof et al. |
| 2011/0102793 | A1 | 5/2011 | Straaijer |
| 2011/0188020 | A1 | 8/2011 | Den Boef |
| 2011/0249244 | A1 | 10/2011 | Leewis et al. |
| 2012/0044470 | A1 | 2/2012 | Smilde et al. |
| 2012/0044495 | A1 | 2/2012 | Straaijer |
| 2013/0162996 | A1 | 6/2013 | Straaijer et al. |
| 2013/0308142 | A1 | 11/2013 | Straaijer |
| 2015/0261097 | A1 | 9/2015 | Mathijssen et al. |
| 2016/0161863 | A1 | 6/2016 | Den Boef et al. |
| 2016/0370717 | A1 | 12/2016 | Den Boef et al. |
| 2019/0107781 | A1 | 4/2019 | Stichting et al. |

FOREIGN PATENT DOCUMENTS

| | | | |
|---|---|---|---|
| EP | 1628164 | 2/2006 | |
| EP | 3136143 | 3/2017 | |
| EP | 3404454 | 11/2018 | |
| EP | 3404454 A1 * | 11/2018 | .......... G02B 6/2552 |
| EP | 3480554 | 5/2019 | |
| EP | 3531191 | 8/2019 | |
| EP | 3647874 | 5/2020 | |
| NL | 2022805 | 4/2019 | |
| NL | 2022892 | 4/2019 | |
| NL | 2023515 | 8/2019 | |
| WO | 2016102127 | 6/2016 | |
| WO | 2017032454 | 3/2017 | |
| WO | 2018127266 | 7/2018 | |
| WO | 2018210598 | 11/2018 | |
| WO | 2019068459 | 4/2019 | |
| WO | 2019166190 | 9/2019 | |
| WO | 2019197117 | 10/2019 | |

OTHER PUBLICATIONS

International Search Report and Written Opinion issued in corresponding PCT Patent Application No. PCT/EP2020/080098, dated Dec. 16, 2020.

Gao, H. et al.: "Highly-sensitive optical fiber temperature sensors based on PDMS/silica hybrid fiber structures", Sensors and Actuators, vol. 284, Oct. 9, 2016.

Köttig, F. et al.: "Generation of micro-J pulses in the deep UV at MHz repetition rates", Optica, vol. 4, Issue 10, pp. 1272-1276 (2017) DOI: 10.1364/OPTICA.4.001272.

Taiwanese Office Action issued in corresponding Taiwanese Patent Application No. 109138789, dated Dec. 2, 2021.

* cited by examiner

METHOD OF MANUFACTURE OF A CAPILLARY FOR A HOLLOW-CORE PHOTONIC CRYSTAL FIBER

This application claims the benefit of priority to European patent application no. 19207624.8, filed Nov. 7, 2019, and of European patent application no. 19213709.9, filed Dec. 5, 2019, each of the foregoing applications is incorporated herein in its entirety by reference.

FIELD

The present disclosure relates to a hollow-core photonic crystal fiber and a hollow-core photonic crystal fiber based broadband radiation generator, and in particular such a broadband radiation generator in relation to metrology applications in the manufacture of, for example, integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

SUMMARY

Metrology tools are used in many aspects of a manufacturing process, for example as alignment tools for proper positioning of a substrate prior to an exposure, leveling tools to measure a surface topology of a substrate, for e.g., focus control, and inspection (e.g., scatterometry based) tools for inspecting/measuring the exposed and/or etched product in process control. In each case, a radiation source is used. For various reasons, including measurement robustness and accuracy, broadband radiation or white light are increasingly used for such metrology applications. It would be desirable to improve on present devices for broadband radiation generation.

In an aspect, there is provided a method for manufacturing a capillary usable as part of a hollow-core photonic crystal fiber, the method comprising: obtaining a capillary having capillary wall comprising a first wall thickness; chemically etching the capillary wall to reduce the wall thickness of the capillary wall; and during performance of the etching, locally varying a control parameter along the length of the capillary, the control parameter relating to reactivity of an etchant used in the etching, so as to control the etched wall thickness of the capillary wall along the capillary length.

In an aspect, there is provided a method of manufacturing a hollow-core photonic crystal fiber, comprising: performing a method for manufacturing a capillary as described herein to manufacture a plurality of capillaries; and assembling the capillaries around a hollow core to form a hollow-core photonic crystal fiber assembly.

In an aspect, there is provided an optical component, comprising: a hollow-core photonic crystal fiber comprising a plurality of capillaries, the length of each of the capillaries comprising a first length portion having a first wall thickness and a second length portion having a second wall thickness, wherein the first length portion and the second length portion each have a substantially uniform inner capillary cross-sectional dimension (e.g., diameter).

Other aspects of the invention comprise a broadband radiation source and metrology device comprising the optical component of the third aspect.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultraviolet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
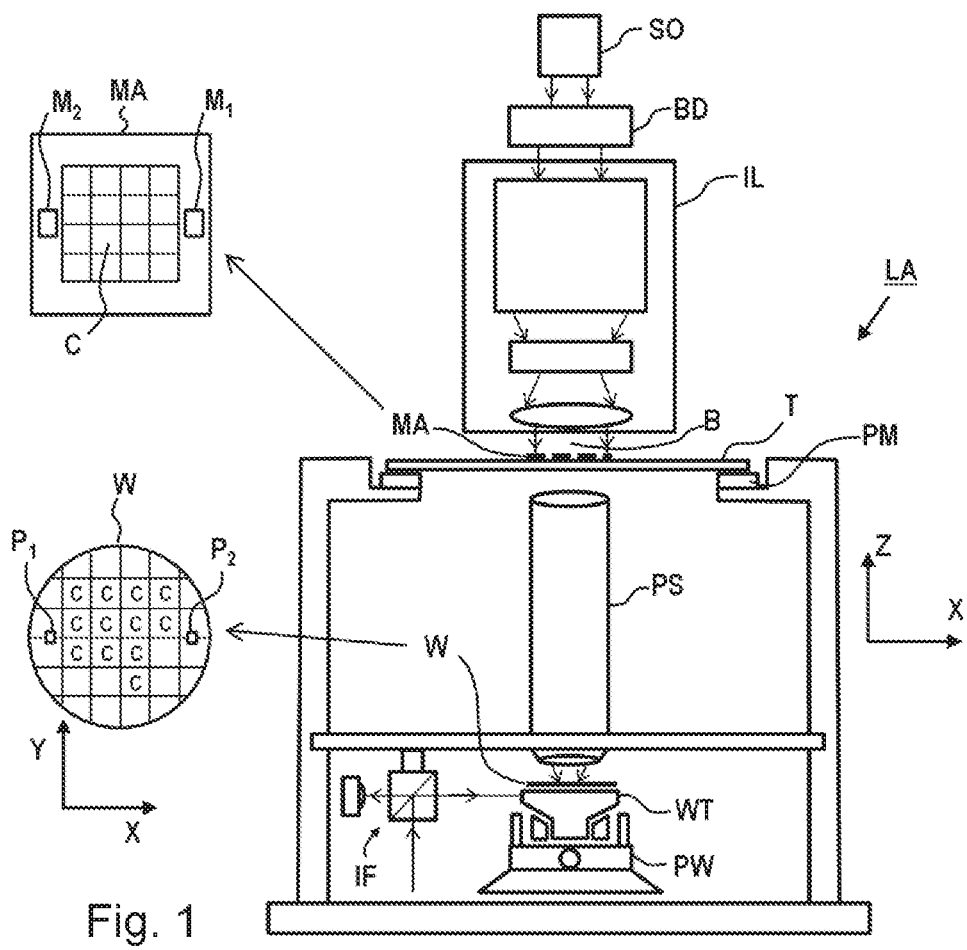
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein in its entirety by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
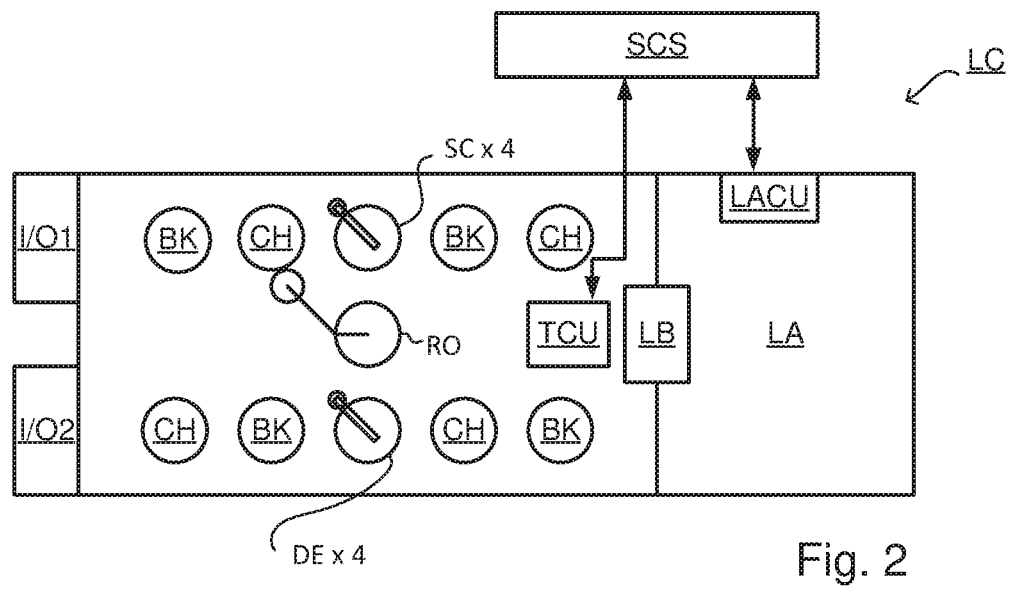
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
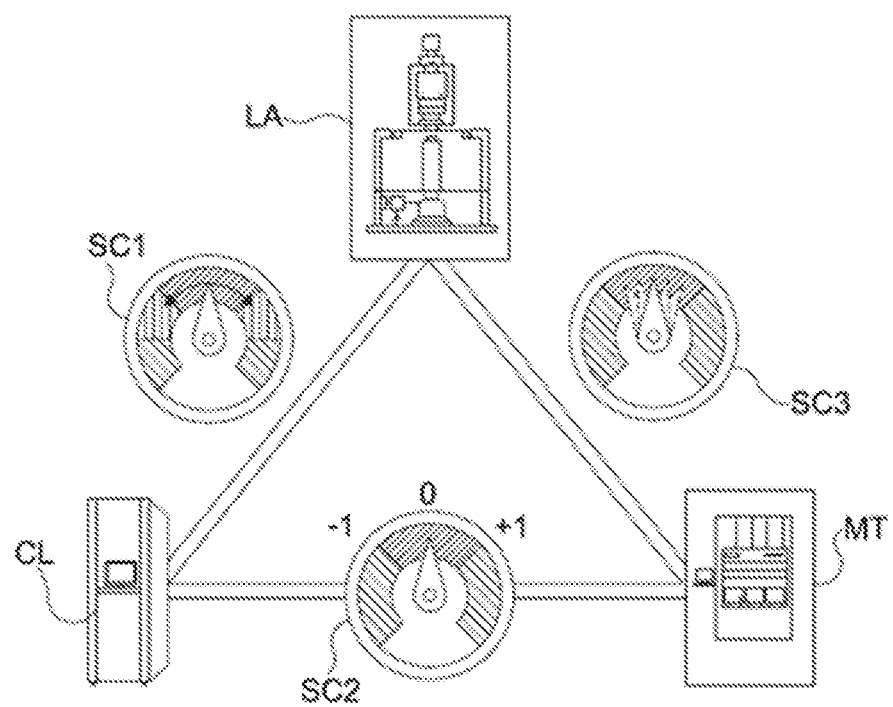
FIG. 3 depicts a schematic representation of holistic lithography, representing a cooperation between technologies to optimize semiconductor manufacturing.

Typically the patterning process in a lithographic apparatus LA is one of the most critical steps in the processing which requires high accuracy of dimensioning and placement of structures on the substrate W. To help ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). An objective of such a "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Examples of metrology devices and associated measurement techniques are further described in U.S. patent application publication nos. US20100328655, US2011102753, US20120044470, US20110249244, US20110026032 and in European patent application publication no. EP1,628,164, each of the foregoing publications is incorporated herein in their entireties by reference. The aforementioned metrology devices may measure gratings using radiation from soft x-ray and visible to near-IR wavelength range.

In a first embodiment, the metrology tool MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the metrology tool MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the metrology tool MT is an ellipsometric scatterometer. The ellipsometric scatterometer allows for determining one or more parameters of a lithographic process by measuring scattered radiation for each polarization state. Such a metrology apparatus emits polarized radiation (such as linear, circular, or elliptic) by using, for example, appropriate one or more polarization filters in the illumination section of the metrology apparatus. A source suitable for the metrology apparatus may provide polarized radiation as well. Various embodiments of existing ellipsometric scatterometers are described in U.S. patent application publication nos. 2007-0296960, 2008-0198380, 2009-0168062, 2010-0007863, 2011-0032500, 2011-0102793, 2011-0188020, 2012-0044495, 2013-0162996 and 2013-0308142, each of which is incorporated herein in its entirety by reference.

Figure 4:
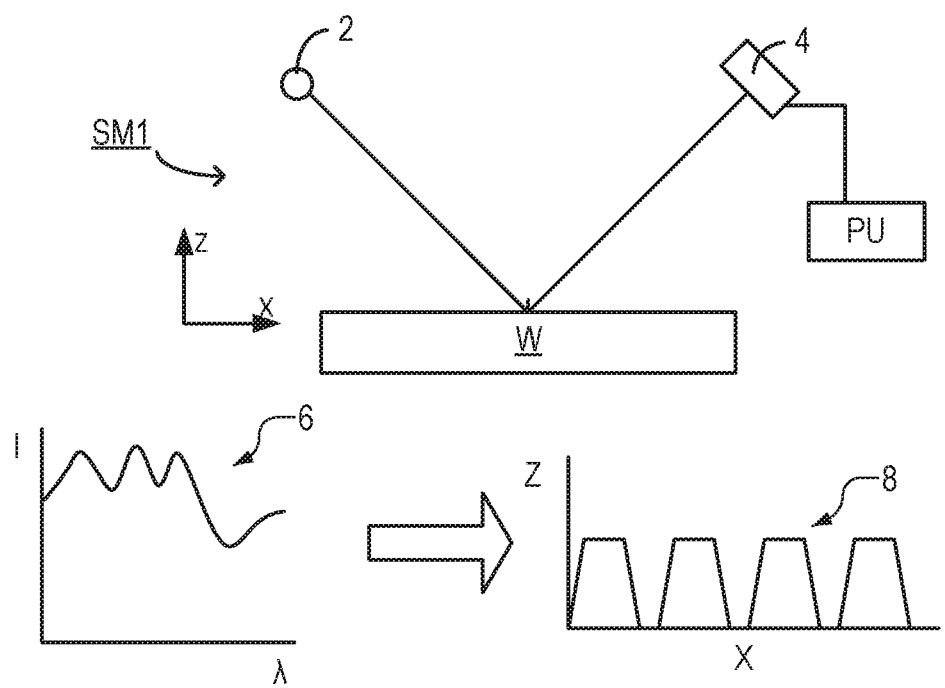
FIG. 4 depicts a schematic overview of a metrology device, which may comprise a radiation source according to an embodiment of the invention.

A metrology apparatus, such as a scatterometer, is depicted in FIG. 4. It comprises a broadband (white light)

radiation projector 2 which projects radiation onto a substrate W. The reflected or scattered radiation is passed to a spectrometer detector 4, which measures a spectrum 6 (i.e. a measurement of intensity as a function of wavelength) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in U.S. patent application publication nos. US2016-0161863 and US 2016/0370717, each of which is incorporated herein in its entirety by reference.

Another type of metrology tool used in IC manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
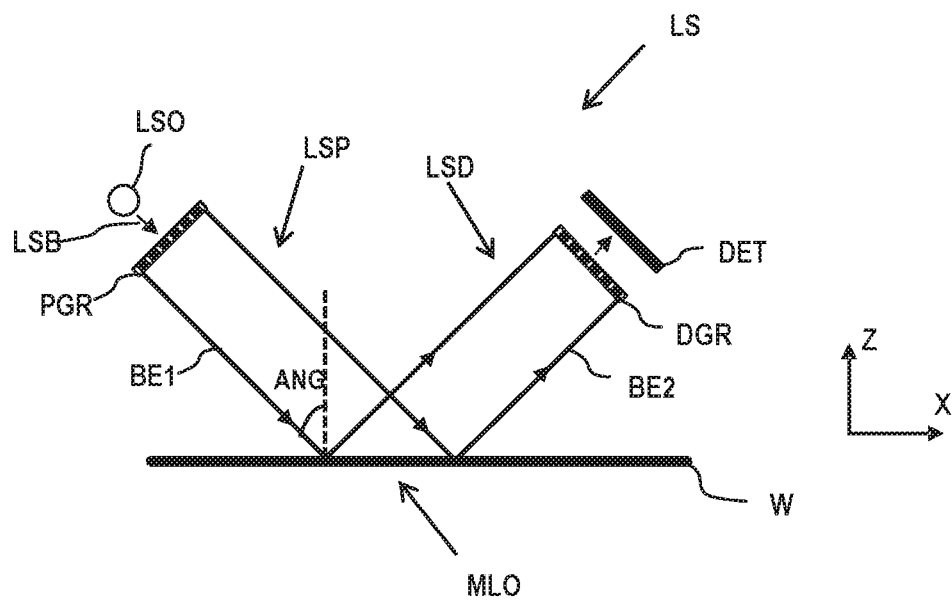
FIG. 5 depicts a schematic overview of a level sensor apparatus which may comprise a radiation source according to an embodiment of the invention.

An example of a level or height sensor LS is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband radiation source, such as a supercontinuum radiation source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the radiation received, for example indicative of the intensity of the radiation received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. patent nos. U.S. Pat. Nos. 7,265,364 and 7,646,471, which are incorporated herein in their entireties by reference. A height sensor using UV radiation instead of visible or infrared radiation is disclosed in U.S. patent application publication no. US 2010233600, incorporated herein in its entirety by reference. In PCT patent application publication no. WO 2016102127, incorporated herein in its entirety by reference, a compact height sensor is described which uses a multi-element detector to detect and recognize the position of a grating image, without needing a detection grating.

Another type of metrology tool used is an alignment sensor. A significant aspect of performance of the lithographic apparatus is the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor that can be used in a lithographic apparatus is based on a self-referencing interferometer as described in U.S. Pat. No. 6,961,116. Various enhancements and modifications of the position sensor have been developed, for example as disclosed in U.S. patent application publication no. US 2015261097, which is incorporated herein in its entirety by reference.

Figure 6:
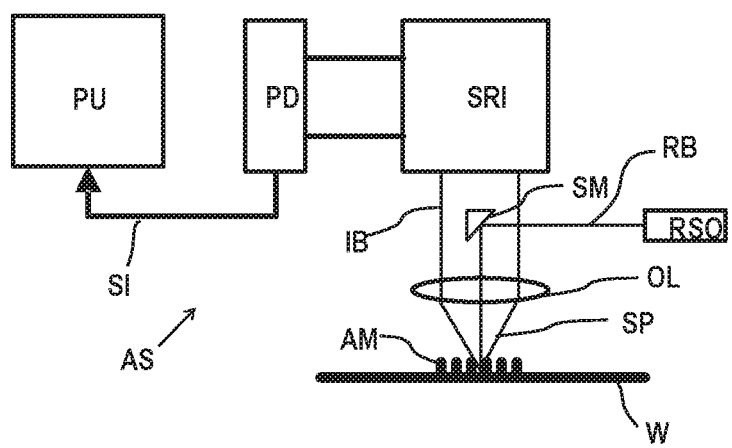
FIG. 6 depicts a schematic overview of an alignment sensor apparatus which may comprise a radiation source according to an embodiment of the invention.

FIG. 6 is a schematic block diagram of an embodiment of an alignment sensor AS, such as described, for example, in U.S. Pat. No. 6,961,116, which is incorporated herein in its entirety by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in cross-sectional dimension (e.g., diameter) than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

For optical semiconductor metrology, inspection applications, such as in any of the aforementioned metrology tools, a bright radiation source which outputs coherent radiation, simultaneously covering a broad wavelength range (e.g., from UV to IR), is often preferred. Such a broadband radiation source can help improve the flexibility and robustness of applications by allowing substrates with different material characteristics to be optically examined in the same setup/system without a need for a hardware change (e.g., changing a radiation source so as to have a specific wavelength). Allowing the wavelength to be optimized for a specific application also means that the accuracy of measurements can be further increased.

Gas lasers, which are based on the gas-discharge effect to simultaneously emit multiple wavelengths, can be used in these applications. However, intrinsic issues such as high intensity instability and low spatial incoherence associated with gas lasers can make them unsuitable. Outputs from multiple lasers (e.g., solid-state lasers) with different wavelengths can be spatially combined into the optical path of a metrology or inspection system so as to provide a multiple wavelength source. The complexity and high implementation costs, which increases with the number of wavelengths desired, prevents such a solution from being widely used. In contrast, a fiber-based broadband or white light laser, also called a supercontinuum laser, is able to emit radiation with high spatial coherence and broad spectral coverage, e.g., from UV to IR, and therefore is a very attractive and practical option.

A hollow-core photonic crystal fiber (HC-PCF) is a special type of optical fiber that comprises a central hollow core region and an inner cladding structure surrounding the hollow core, both of which extend axially along the entire fiber. The radiation guidance mechanism is enabled by the inner cladding waveguide structure, which may comprise, for example, thin-walled glass elements, which may be referred to as anti-resonant elements (AREs). The radiation is thus confined predominantly inside a hollow core and propagates along the fiber in the form of transverse core modes.

A number of types of HC-PCFs can be engineered, each based on a different physical guidance mechanism. Two such HC-PCFs include: hollow-core photonic bandgap fibers (HC-PBFs) and hollow-core anti-resonant reflecting fibers (HC-ARFs).

HC-PCFs comprise hollow channels which are filled with a fluid, such that they possess resultant desired characteristics for various radiation guiding applications; for example, high-power beam delivery using HC-PBFs and gas-based broadband radiation or white light generation (or supercontinuum generation) using HC-ARFs. Detail on the design and manufacture of HC-PCFs can be found in U.S. patent application publication no. US2004175085 (for HC-PBFs) and PCT patent application publication no. WO2017032454 (for HC-ARFs), which are incorporated herein in their entireties by reference. HC-PBFs are configured to offer low loss but narrow bandwidth radiation guidance via a photonic bandgap effect established by the cladding structure surrounding the central hollow core. Whereas HC-ARFs are engineered to significantly broaden the transmission bandwidth via anti-resonant reflection of radiation from the cladding.

Figures 7A, 7B, 7C, 7D:
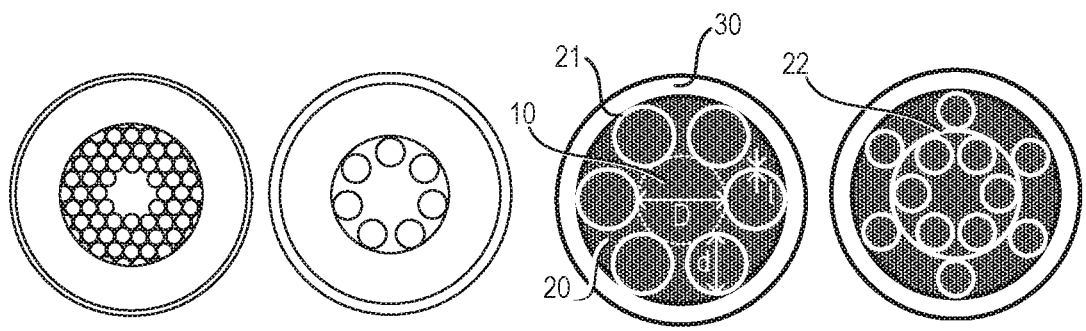
FIGS. 7A, 7B, 7C and 7D schematically depict the transverse cross-sections of a number of HC-PCF designs for supercontinuum generation.

FIG. 7 depicts in cross-section, a number of types of HC-PCFs, and are examples of HC-PCFs for which the concepts disclosed herein can be used in combination with and/or applied to. FIG. 7A shows a Kagome fiber, comprising a Kagome lattice structure. FIG. 7B shows a single-ring or revolver fiber, where the hollow core region is formed and surrounded by a layer of non-touching rings.

FIGS. 7C and 7D show transverse cross-sections of practical examples of HC-PCFs disclosed in PCT patent application publication no. WO 2017032454. The circles represent the solid material of anti-resonant elements (AREs) or outer cladding region, like quartz glass or silica, while the shaded portions are free of solid materials (evacuated or filled with gas or liquid).

Each HC-PCF comprises a hollow core region 10 (represented in FIG. 7C by a dotted circle), an inner cladding region 20 with multiple anti-resonant elements (AREs) 21, and an outer cladding region 30. The hollow core region 10 is the empty space, between the AREs 21, extending along the longitudinal length of the HC-PCF and having a smallest transverse core dimension D. The AREs 21 of the inner cladding region 20 may comprise capillaries having a wall thickness t and a smallest transverse ARE dimension d. The AREs 21 may be fixed to the inner surface of the outer cladding region 30. The outer cladding region 30 may comprise a larger capillary being made of e.g. glass and providing a closed cladding of the HC-PCF.

The HC-PCF of FIG. 7C illustrates an embodiment wherein the AREs 21 comprise a single-ring of thin-wall capillaries with, in this case, a circular transverse cross-section (e.g., inner diameter d=13.6 μm and wall thickness t=0.2 μm) arranged within the larger capillary of the outer cladding region 30 in, in this case, six-fold symmetric pattern so as to create a central hollow core of $cross\text{-}sectional\ dimension$ (e.g., diameter) D (the shortest distance between diametrically opposite AREs 21), with e.g., D=20 μm. The outer cladding region 30 may have an outer cross-sectional dimension (e.g., diameter) of 125 μm and a cladding thickness of 38 μm. Alternatively, the core dimension D can be selected in a range from 10 μm to 1000 μm, wherein the other geometrical parameters (like d, t) are scaled accordingly.

FIG. 7D shows a modified embodiment with multiple, in particular two, coaxial rings of AREs 21 (e.g., d=13.6 μm, t=0.2 μm, and D=20 μm) arranged within the outer cladding region 30 with, in this case, six-fold symmetry. For holding the inner and outer rings of AREs 21, a support tube 22 is included in the HC-PCF. The support tube 22 is made of e.g. silica with a $cross\text{-}sectional\ dimension$ (e.g. diameter) of e.g. 48 μm.

The examples of HC-PCFs as shown in FIGS. 7C and 7D can be modified, in particular with regard to the number of the AREs 21 (AREs may number 4 or 5 or 7 or more, for example) and number of rings (e.g., more rings than the two ring example of FIG. 7D, such as three rings). The ARE arrangement may be varied in a number of other ways. Each ARE 21 may have e.g., an elliptic or polygonal cross-section; the inner shape of the outer cladding 30 may have e.g. a polygonal cross-section; and the solid materials of the AREs 21, may comprise e.g., plastic material, like PMA, glass, like silica, or soft-glass.

For gas-based broadband radiation or white light generation, a HC-PCF may be comprised within a gas cell, which is designed to operate, for example, at a pressure up to many 10s of bars (e.g., between 3-100 bar). A gas-filled HC-PCF can act as an optical frequency converter when being pumped by an ultrashort pump laser pulse with sufficient peak power. The frequency conversion from ultrashort pump laser pulses to broadband laser pulses is enabled by a complicated interplay of the dispersion and nonlinear optical processes inside the gas-filled fiber. The converted laser pulses are predominantly confined within the hollow core in the form of transverse core modes and guided to the fiber end. Part of the radiation, for example higher order transverse core modes or specific wavelengths, may leak from the hollow core through the inner cladding waveguide structure and undergoes strong attenuation during its propagation along the fiber. The core region and the cladding region of a HC-PCF can be configured such that the higher order core modes are phase matched to the higher order cladding modes. In this way, the higher order core modes can resonantly couple with the higher order cladding modes which subsequently get attenuated or suppressed. In such a manner, low loss and effectively single transverse mode transmission can be obtained in a broad spectral range.

One or more spatio-temporal transmission characteristics of a laser pulse, e.g. its spectral amplitude and/or phase, transmitted along a HC-PCF can be varied and tuned through adjustment of one or more pump laser parameters, one or more filling gas parameters and/or one or more fiber parameters. The one or more transmission characteristics may include one or more selected from: output power, output mode profile, output temporal profile, width of the output temporal profile (or output pulse width), output spectral profile, and/or bandwidth of the output spectral profile (or output spectral bandwidth). The one or more pump laser parameters may include one or more selected from: pump wavelength, pump pulse energy, pump pulse width, and/or pump pulse repetition rate. The one or more fiber parameters may include one or more selected from: fiber length, size and/or shape of the hollow core, size and/or shape of the cladding structure, and/or thickness of a wall surrounding the hollow core. The one or more filling gas parameters may include one or more selected from: gas type, gas pressure and/or gas temperature.

The filling gas can be a noble gas such as argon, krypton, or xenon, a Raman active gas such as hydrogen, deuterium or nitrogen, or a gas mixture such as an argon/hydrogen mixture, a xenon/deuterium mixture, a krypton/nitrogen mixture, or a nitrogen/hydrogen mixture. Depending on the type of filling gas, the nonlinear optical processes can include modulational instability (MI), soliton fission, Kerr effect, Raman effect and/or dispersive wave generation, details of which are described in PCT patent application publication no. WO2018/127266 and U.S. Pat. No. 9,160,137 (both of which are hereby incorporated in their entireties by reference). Since the dispersion of the filling gas can be tuned by varying the gas cell pressure, the generated broadband pulse dynamics and the associated spectral broadening characteristics can be adjusted so as to optimize the frequency conversion. The generated broadband laser output can cover wavelengths from UV (e.g., <200 nm) to mid-IR (e.g., >2000 nm).

Figure 8:
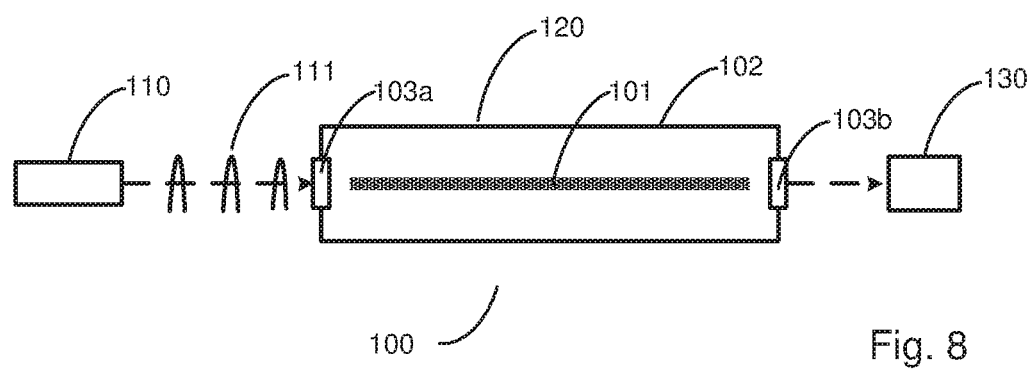
FIG. 8 schematically depicts a gas filled HC-PCF based broadband radiation source device.

As illustrated in FIG. 8, a broadband radiation source device 100 comprises a pump laser 110 outputting a train of pump pulses 111, an optical component 120 spectrally broadening the input pump pulse and, for example, an optical diagnostic device 130 measuring the output broadband spectrum. The optical component 120 comprises a HC-PCF (e.g., a HC-ARF) 101 having a specific fiber length and a gas cell 102 filled with a working gas or a gas mixture at a specific pressure or with a pressure distribution. The gas cell 102 further comprises an input optical window 103a and an output optical window 103b, located at respective ends of the gas cell 102. The input optical window 103a is operable to admit ultrashort pump laser pulses into the gas cell 102 via the window. After being coupled into the gas-filled HC-PCF 101, pump laser pulses 111 propagate along the fiber where they experience significant spectral broadening. Resultant broadband laser pulses are subsequently discharged from the gas cell 102 via the output optical window 103b and, for example, measured by the optical diagnostic device 130 (e.g. a spectrometer).

To fill the HC-PCF 101 with a working gas, the gas cell 102 may be in communication with a pressurized gas supply or reservoir (not shown). The inner surfaces of the walls and windows 103a, 103b of the gas cell 102 enclose a cavity. The axis of the gas cell is parallel to the axis of the HC-PCF 101.

The optical properties (e.g. shape and properties of the generated spectrum, guidance loss, bending loss, etc.) of a broadband, supercontinuum radiation source based on gas-filled HC-PCF depend strongly on the geometry of the core region. Three parameters are particularly relevant:

Core Cross-Sectional Dimension (e.g., referring to FIG. 7C, the cross-sectional dimension (e.g., diameter) D of the inscribed shape (e.g., circle) bounding the core-facing surfaces of the AREs 21 or capillaries). The core cross-sectional dimension may be tightly constrained by the primary design objectives of the system (e.g., pump wavelength, spectrum, pulse energy, etc.) since it largely determines the non-linear and dispersion properties of the fiber.

Capillary Cross-Sectional Dimension: The capillary cross-sectional dimension (e.g., ARE cross-sectional dimension (e.g., diameter) d in FIG. 7C) can be varied to a certain degree without significantly impacting the optical properties of the system. More precisely, the relevant parameter here is the ratio of the capillary to core cross-sectional dimension, though as already stated, there is little flexibility in the core cross-sectional dimension. There is more scope in the capillary cross-sectional dimension to vary this ratio; however, this scope is still limited as it is desirable for the capillary cross-sectional dimension to fall within a certain range of the core cross-sectional dimension so as to dampen higher order modes effectively and to achieve low loss.

Capillary wall thickness: The thickness of the capillary (ARE) walls (parameter t in FIG. 7C) determines the optical confinement loss of the fiber (generally, thicker capillary walls lead to better confinement at a given wavelength). However, when the optical wavelength of a component of the generated supercontinuum radiation becomes "resonant" with the wall thickness, the fiber loses its guidance properties and strong excess losses occur around the resonance wavelengths. By way of example, for a typical design, the fundamental resonance may be at a wavelength about 2.3× wall thickness.

It can be shown, for example, that a spectrum for a fiber with a capillary wall thickness of 300 nm will have fundamental resonance at wavelengths around 700 nm, leading to a significant drop of the power spectral density toward shorter wavelengths. In addition, the mode profile at the resonance is typically highly distorted and non-Gaussian, and such resonances can cause polarization and fiber lifetime issues. Also such a fiber may display a $2^{nd}$ order resonance at wavelengths around 350 nm, effectively rendering the wavelength range around this resonance unusable. For a fiber with capillary wall thickness of 150 nm, the fundamental resonance would be at around 350 nm, again negatively impacting the usefulness of the fiber for such wavelengths.

It is therefore proposed that the HC-PCF of applications described herein comprise a capillary wall thickness chosen to locate resonance wavelengths at wavelengths within the spectrum which have low or minimal negative impact on the supercontinuum generation output; possibly even positioning the resonant wavelengths outside of the operating wavelength band altogether. For UV applications in particular, this implies that the capillary wall thickness should be very thin. For example, to obtain usable output within the UV range (e.g., a wavelength range of about 200-250 nm), without at least one resonance at longer wavelengths, a capillary wall thickness may have to be 100 nm or less, with a capillary cross-sectional dimension to capillary wall thickness ratio greater than 100:1.

While capillaries with a wall thickness of 100 nm or less can be sufficiently mechanically stable for practical use, it can be extremely difficult to draw such capillaries directly in a conventional PCF drawing process. This can be intuitively understood: During the PCF drawing process the capillary cross section shrinks as the capillary travels through the heat zone of the drawing oven. At the same time, the capillaries expand or contract depending on the pressure differential between the core and the capillaries. The thinner the capillary wall becomes, the more sensitive the shrink or expansion rate is to the pressure differential. At about a 100 nm wall thickness, this sensitivity can reach the point where it becomes impractical to control the pressure differential, temperature and material parameters with sufficient precision to achieve a desired core to capillary cross-sectional dimension ratio.

It is proposed here that instead of drawing a capillary directly with the desired parameters, the capillary is drawn with a wall thickness comfortably within the envelope of what can be controlled (e.g. walls>200 nm thick), and then subsequently reduced (e.g., to <100 nm) in a subsequent controlled etch step. Capillaries made in this way may be suitable for use as AREs in a HC-PCF that is optimized or designed to output broadband radiation including wavelengths in a UV range (e.g., a wavelength range of about, 200-250 nm).

In an embodiment, the etching may comprise a wet etching process to reduce the wall thickness. As such, the wall thickness of the capillaries (anti-resonant elements) of the HC-PCFs can reduced via a chemical wet etching process using a suitable etching chemical or etchant (e.g., a suitable acid or alkali such as hydrofluoric acid (HF)). An aqueous solution of such an etchant (e.g., a dilute aqueous solution of HF) may be pumped through the fiber core and capillaries to thin the walls to a desired thickness.

In practice, however, it may be difficult to achieve sufficiently uniform etch rates and therefore a uniform (or otherwise controlled) final wall thickness over the desired length of fiber (which may be several centimeter long), as the reactivity of the etchant tends to vary (e.g., drop) along the capillary. This may be as a result of the etchant being consumed during its passage through the capillary and/or due to the effects of build-up of by-products of the etching process. The exact dependency of the etch rate on the position in the fiber and therefore exposure time appears to be complicated (e.g. dependent on local pH, whether buffered or un-buffered etchant is used and so forth). Note that the dynamics are fundamentally different to etch processes in, e.g. semiconductor processing, where usually a near inexhaustible supply of etchant is available. A low etch rate and high total reactivity of the etchant may be preferred so that depletion is kept to a minimum. This can be achieved with buffered (BOE) etchants; however these are still observed to suffer from a decay in the etch rate as they flow through the capillary. The reasons are not fully understood, but are likely related to a change in the local pH.

In an embodiment, it is therefore proposed to apply a temperature gradient to the capillary e.g., to locally control temperature with respect to position along the fiber/capillary length. The reactivity of most etchants is temperature dependent, and a drop in reactivity can be compensated by a suitable temperature correction control so as to achieve a substantially uniform etch rate and therefore uniform wall thickness. Such a temperature control may comprise a temperature gradient which is colder at the inlet (i.e., where the etching chemical is introduced into the capillary) where the underlying reactivity is high, with the temperature gradually increasing towards the outlet (i.e., where the etching chemical is removed from the capillary). In practice, a wall thickness uniformity of <10 nm has been achieved, reducing an initial wall thickness of 300 nm to 100 nm (i.e. with <5% variation in the etch rate).

In alternative embodiments to wet etching, dry-etching (e.g., with a gaseous etchant such as HF gas) is possible, although surface quality of capillaries may not be as good as for wet etching. In this embodiment, the etch rate may be controlled via local temperature control in a manner similar to a wet etching embodiment. Any other suitable embodiment for local reactivity control is also possible and within the scope of this disclosure. For example, a photo-sensitive etchant (i.e., etchant having a photo-sensitive reactivity) may be used with local control of a suitable radiation intensity to locally control photo-activation of the etchant (e.g., subjecting the capillary to an intensity gradient along its length during etching).

Confinement loss and bending loss of a HC-PCF depend on the wall thickness of the capillaries and for wavelengths longer than the first (fundamental) resonance, thicker walls result in better confinement. In a typical Modulational Instability (MI) based single core source, the pump radiation initially experiences only a small degree of spectral broadening. At a certain point during propagation along the fiber, the spectrum suddenly broadens, the broadened spectrum comprising the wavelengths which are impacted by the occurrence of core wall resonances. Therefore, to improve power efficiency, it may be desirable to employ a fiber having a thicker capillary wall where the spectrum is narrow and confined to longer wavelengths, and a thinner capillary wall where the spectrum is broad and avoiding resonances is desirable.

The core wall resonances can also alter the local dispersion profile of the fiber (e.g., creating a dispersion zero-crossing on each side of the resonance). As such, it may be desirable to move the wavelength at which these local alterations occur gradually along the fiber to improve the properties of the generated super continuum (e.g. increase the coverage of UV/DUV wavelengths and/or flatten the spectrum).

Therefore, in an embodiment, it is proposed to extend the local etch rate control concept to deliberately create a non-uniform capillary wall thickness profile (for example to modify dispersion properties), e.g., by applying a suitable temperature (or photo-intensity) profile during the etching process. This may be done to improve confinement and/or move the wavelength at which local dispersion profile alterations occur.

Figure 9:
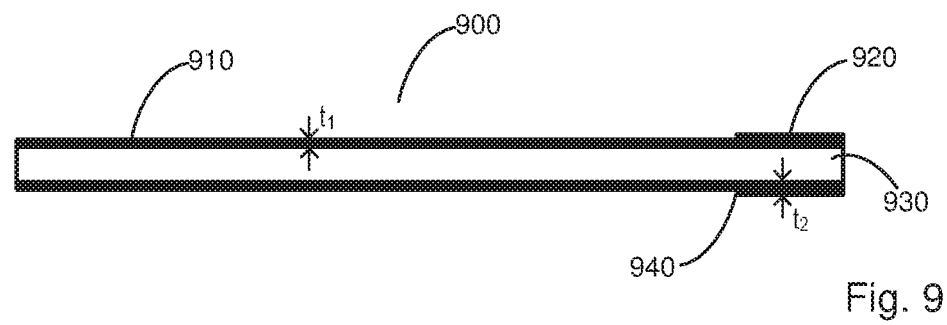
FIG. 9 schematically depicts a capillary with non-uniform wall thickness according to an embodiment.

FIG. 9 illustrates a cross section of a capillary 900 made according to such an embodiment. Such a capillary wall thickness profile may comprise a wall thickness $t_1$ of less than 100 nm along a first portion 910 of the capillary, corresponding to a main supercontinuum generation region of the HC-PCF (e.g., for generating radiation in a UV range), and a thicker capillary wall thickness $t_2$ (e.g., greater than 100 nm, greater than 150 nm or greater than 200 nm) at a second portion 920 of the capillary at the end of the fiber for receiving the pump radiation 930. This can be achieved by a corresponding drop (e.g., a step drop) in temperature during etching of the second portion than when etching the first portion. The full temperature profile may therefore comprise a temperature gradient to maintain a largely uniform wall thickness for the first portion 910 and a step drop in the temperature profile corresponding to a transition point/region 940 between first and second portions. There may also be a temperature gradient to maintain a largely uniform wall thickness for the second (thicker) portion 920, though uniform thickness in this region is less important. In an embodiment the second portion may be considerably shorter than the first portion (e.g., the first portion may comprise over 60%, over 70%, over 80%, over 90% or over 95% of the capillary length). The two portions may comprise uniform inner cross-sectional dimensions (which may be substantially equal as illustrated or may differ).

In an embodiment, a capillary may be collapsed to define a tapered core region at each end of the hollow-core photonic crystal fiber, the tapered core region defining a region where a hollow core of the hollow-core photonic crystal fiber has an increasing cross-sectional dimension towards each end of the hollow-core photonic crystal fiber. This can improve the lifetime of the supercontinuum source, as is described in PCT patent application publication no. WO 2018/210598, which is incorporated herein in its entirety by reference.

Figure 10:
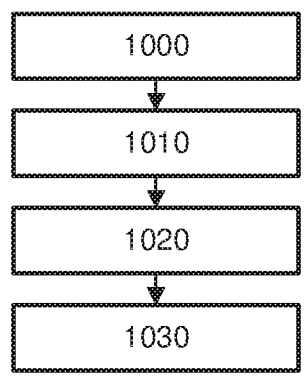
FIG. 10 is a flowchart describing a method for manufacturing a capillary according to an embodiment.

FIG. 10 is a flowchart describing a method of manufacturing a HC-PCF according to an embodiment. At step 1000, capillaries are drawn with a wall thickness which is comfortably controllable drawing the drawing process (i.e., to form AREs as part of a HC-PCF e.g., according to any of the configurations of FIG. 7, or any variation thereon). At step 1010, a suitable temperature profile (and/or photo-intensity) is determined e.g., empirically/by trial and error. This may comprise, for example, etching several test fibers at varying temperatures for various times and/or flow rates, measuring the resulting wall thickness (e.g., destructively by taking SEM pictures) and parameterizing the results. Alternatively the temperature (and/or photo-intensity) profile may be determined by modeling of the etch process. At step 1020, this temperature (and/or photo-intensity) profile is locally applied during the etching of the (e.g., inner) wall of each capillary, so as to thin them to a desired thickness. This step may comprise introducing the etchant at one end of the capillary and locally varying the temperature (and/or photo-intensity) along the capillary length during etching. Steps 1010 and 1020 may define and apply temperature (and/or photo-intensity) control for providing a largely (e.g., as much as practically possible) uniform thickness over the entire length, or to define any other thickness profile (such as the profile illustrated in FIG. 9). Optional step 1030 may comprise collapsing the ends of the capillaries.

Alternatively, or in addition to step 1010, the applied temperature (and/or photo-intensity) may be determined during etching by monitoring the capillary thickness during etch and adjusting the temperature (and/or photo-intensity) accordingly in a feedback method.

Alternatively or in addition to the above disclosure, a desired wall profile may be obtained by etching the fiber from both sides, so as to have the time taken. This averages out the variation in the etch rate (at the expense of some uniformity).

Alternatively or in addition to the above disclosure the fiber may be filled with etchant in as short a time as possible, after which the flow is stopped and the etching process continued until depletion; followed by purging the etchant. If the fiber can be filled in a much shorter time than it takes for the etchant to be depleted, etching will be largely uniform along the length.

In the above embodiments, or when etching the capillary generally, the connecting of the etching fluid supply line to the fiber means that the fluid becomes distributed through many parallel paths or channels (e.g., paths through each capillary and a separate path outside of the capillaries within the outer cladding). Since each channel has its own flow impedance this leads to different etching rates inside of each of these channels; a higher impedance results in a lower flow and hence a larger gradient in the concentration of the etching agent. This hinders control over the final wall dimensions along the fiber, and also between the different channels.

Control of the thickness of the portion of wall of each capillary facing (and defining) the hollow core of the fiber is of particular importance, since this thickness is directly linked to the wavelength dependent loss of the fiber.

To address this, it is proposed in an embodiment that the etching is performed in a manner where the etchant flows through only a single pathway during the etching process. To do this, it is proposed to collapse the capillaries prior to the etching step such that no etchant enters and flows through the capillary channels during etching. The collapsing may be performed, for example, using the methods already described above (e.g., in optional step 1030) and in the aforementioned PCT patent application publication no. WO2018/210598. This embodiment may be a separate, stand-alone, embodiment, or may be performed in combination with any of the embodiments described above with local variation of a control parameter to locally control etch rate.

Figure 11:
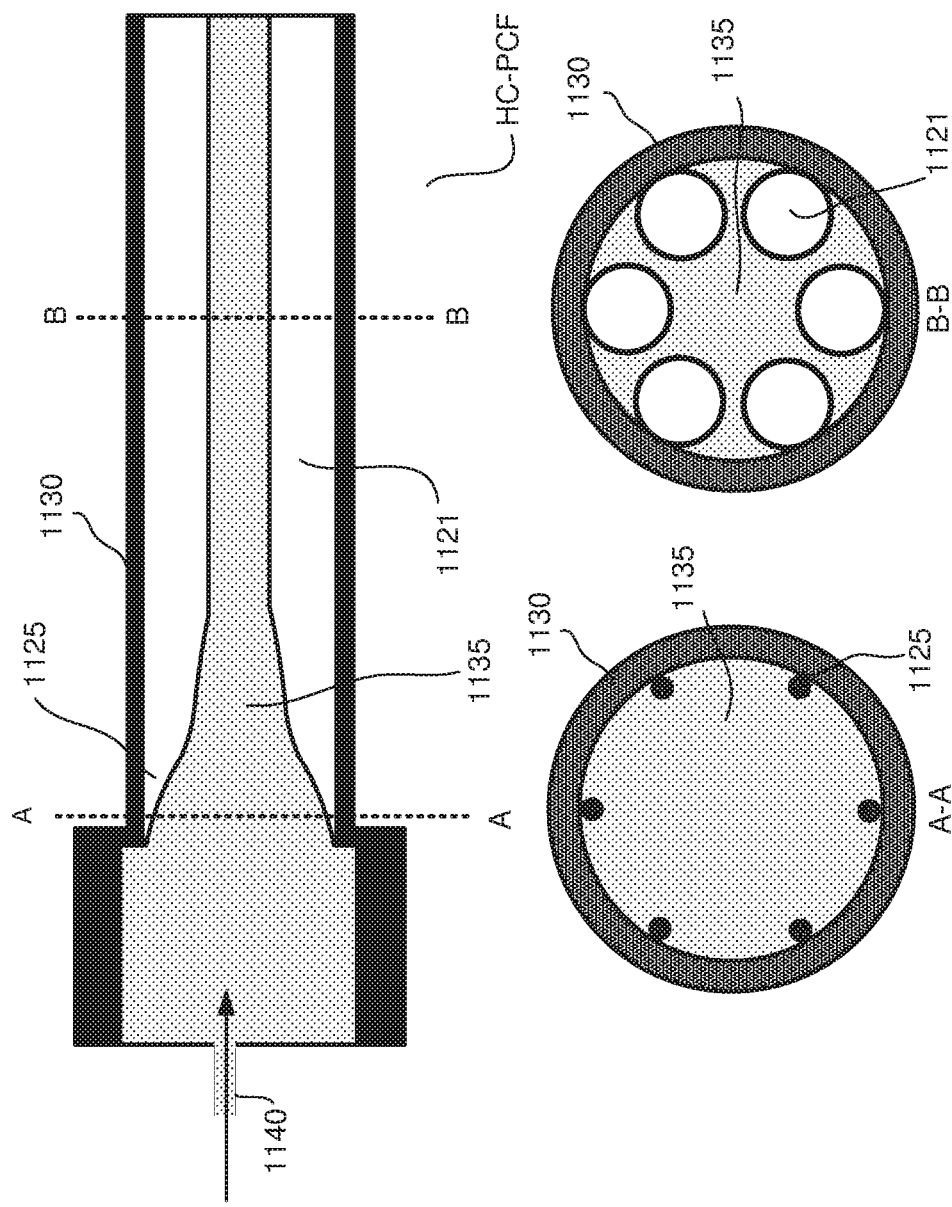
FIG. 11 schematically depicts a HC-PCF with collapsed capillary ends illustrating an etching step according to an embodiment.

FIG. 11 illustrates an example of this approach. FIG. 11 shows a HC-PCF in cross-section along the longitudinal axis (top) and perpendicular to the longitudinal axis, respectively along A-A and B-B (bottom). The HC-PCF comprises AREs/capillaries 1121 with collapsed ends 1125, such that the ends are sealed to the etchant (shaded regions) 1135 which is introduced via an inlet 1140. The etchant 1135 is therefore contained within the outer cladding 1130, but does not enter the capillaries 1121. As such, there is only a single etchant path through the HC-PCF and the capillaries 1121 are etched from the outside only.

After etching, the fiber ends can be cleaved to reestablish open capillaries. Subsequent to this, the optional end collapsing step (step 1030) may be performed (again), to improve the lifetime of the supercontinuum source as has been described.

In an embodiment, it is proposed that the etching of the capillary walls be performed in a sequence of flow and temperature cycles to promote a homogeneous etching rate along the fiber and that avoids delicate balancing acts between flow rate and temperature (and/or photo-intensity) profiles. Each cycle creates a quantized removal of material from the capillary walls. This embodiment may be a separate, stand-alone, embodiment, or may be performed in combination with any of the embodiments describe above; e.g., with local variation of a control parameter to locally control etch rate and/or closed capillaries to define a single etchant path.

The embodiment may be performed using an etching fluid of very low concentration (e.g. 0.1% to 0.5% HF in water). The fiber may be maintained at a stable temperature by means of a temperature controlling element, creating a high temperature homogeneity along the fiber (e.g., using a local temperature control as described previously).

Figure 12A:
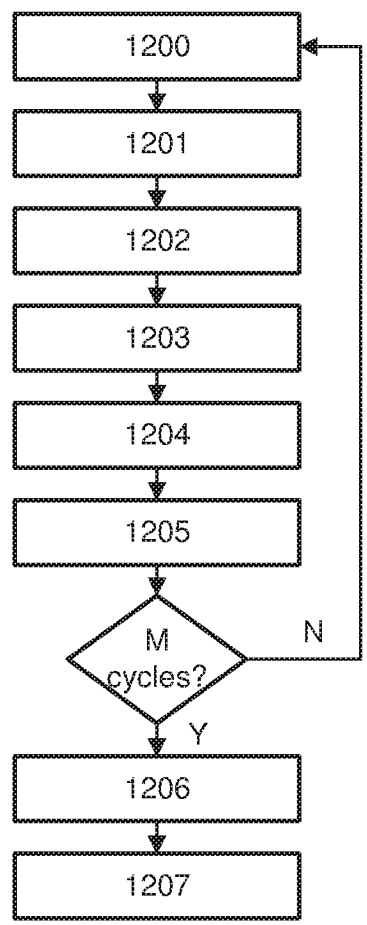
FIG. 12A is a flowchart depicting an etching method according to an embodiment.

FIG. 12A is a flowchart describing an example of such a method. The method may comprise repeated cycles of steps 1200 to 1205:

1200. Lower the temperature of the HC-PCF and/or etchant (e.g., less than 5° C., for example to ~3° C.);

1201. Establish a flow with zero etchant concentration (0% HF) until fiber is fully permeated;

1202. Establish a flow with etchant (e.g., low concentration such as ~0.5% HF) until fiber is fully permeated. The etching rate at this concentration/temperature will be very low;

1203. Stop the etching fluid flow;

1204. Increase the temperature (e.g., to over 20° C., over 30° C., over 35° C. or ~40° C.) such that the etching rate increases greatly;

1205. Wait until all etching agent has become fully depleted (concentration of the etching agent becomes effectively 0%). Due to homogeneous starting conditions along the fiber and high flow impedance along the fiber the capillary walls will be etched with a fixed reduction.

Steps 1200 to 1205 are repeated M times; after which two final steps are performed to finish:

1206. Reduce the temperature (e.g., less than 5° C., for example to ~3° C.); and

1207. Flush with 0% HF until fiber is fully permeated.

The enhanced etching step (step 1202) can be accompanied by (or partially or completely replaced with) increased radiation activation of the etching process using a photosensitive etchant.

Each cycle will remove a quantized amount of thickness from the capillary walls. By automating the etching cycle process the total amount of wall thickness reduction can be controlled more precisely.

Figure 12B:
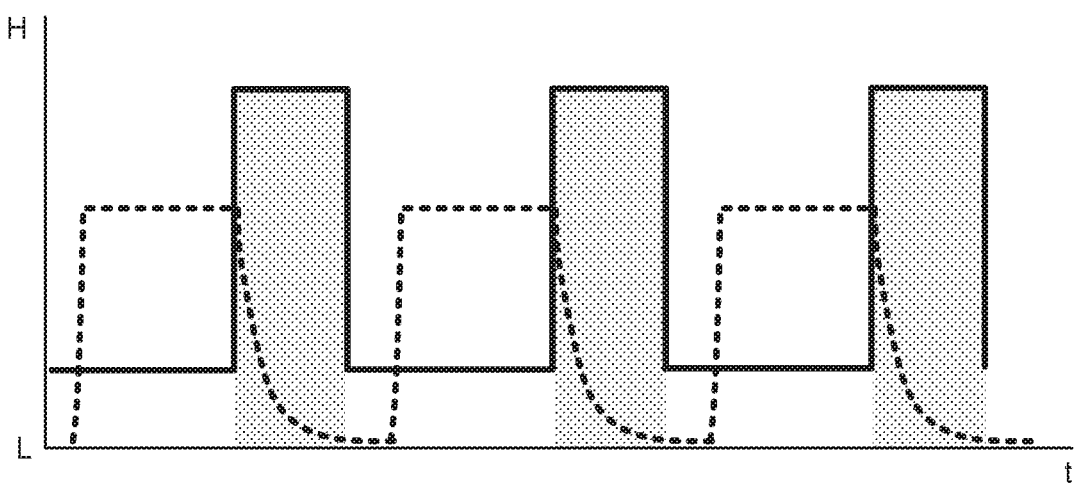
FIG. 12B is a graph graphically depicting the method of FIG. 12A.

FIG. 12B is a graphical representation of a processing cycle showing a plot of temperature (solid line), the etchant concentration present inside the fiber (dotted line) and the time intervals in which a fixed amount of material is removed from the capillary walls (shaded areas). The graph has time on the x axis and varies between high H and low L on the y-axis; i.e., high-low etchant concentration or high-low temperature.

The embodiments of FIGS. 11 and 12, and the embodiments presented in the above discussions of FIGS. 11 and 12 can also be used independently of the previous discussed embodiments in which a control parameter of the etching process is locally varied. In other words, also closing an end of one or more capillaries and/or having controlled cycles of etching with e.g. relatively low concentrations etching liquid can be used to better control a wall thickness of the capillaries.

Further embodiments are disclosed in the subsequent list of numbered clauses:

1. A method for manufacturing a capillary usable as part of a hollow-core photonic crystal fiber, the method comprising:
   obtaining a capillary having capillary wall comprising a first wall thickness;
   chemically etching the capillary wall to reduce the wall thickness of the capillary wall; and
   during performance of the etching, locally varying a control parameter along the length of the capillary, the control parameter relating to reactivity of an etchant used in the etching step, so as to control the etched wall thickness of the capillary wall along the capillary length.
2. A method as defined in clause 1, wherein the varying of a control parameter comprises control of local temperature during the etching step.
3. A method as defined in clause 2, comprising increasing the temperature along the capillary length from an etchant inlet to an etchant outlet.
4. A method as defined in clause 1, wherein the etchant is photo-sensitive and the varying of a control parameter comprises control of radiation intensity of a radiation source operable to illuminate the etchant.
5. A method as defined in clause 4, comprising increasing the radiation intensity along the capillary length from an etchant inlet to an etchant outlet.
6. A method as defined in any of clauses 1 to 5, comprising varying the control parameter in accordance with a control parameter profile, the control parameter profile defining an applied local value for the control parameter with respect to the capillary length.
7. A method as defined in any of clauses 1 to 6, wherein the varying of the control parameter comprises varying the control parameter to define a substantially uniform first etched wall thickness over at least a portion of the capillary length.
8. A method as defined in any of clauses 1 to 7, wherein the varying of the control parameter comprises varying the control parameter to define the substantially uniform first etched wall thickness over the whole of the capillary length.
9. A method as defined in any of clauses 1 to 7, wherein the varying of the control parameter comprises varying the control parameter to define a non-uniform etched wall thickness over the capillary length.
10. A method as defined in clause 9, wherein the non-uniform etched wall thickness comprises a first etched wall thickness over a first portion of the capillary length and a second etched wall thickness over a second portion of the capillary length.
11. A method as defined in clause 10, wherein the second etched wall thickness is greater than 100 nm.
12. A method as defined in any of clauses 7 to 11, wherein the first etched wall thickness is smaller than 100 nm.
13. A method as defined in any of clauses 1 to 12, wherein the etchant is a wet etchant.
14. A method as defined in any of clauses 1 to 12, wherein the etchant is a dry etchant.
15. A method as defined in any of clauses 1 to 14, comprising an initial step of drawing the capillary to the first wall thickness.
16. A method as defined in any of clauses 1 to 15, wherein the etching is performed in repeated cycles of very low reactivity of the etchant and higher reactivity of the etchant.
17. A method as defined in clause 16, wherein the repeated cycles are controlled by repeated cycling of the control parameter between a value which results in low reactivity and a value which results in higher reactivity.
18. A method as defined in clause 17, wherein, for each cycle, the control parameter is maintained at the value which results in higher reactivity until the etchant is fully depleted.
19. A method as defined in any of clauses 16 to 18, wherein the etchant concentration is less than 0.5% of an active etchant chemical.
20. A method as defined in any of clauses 16 to 19, including initial and final steps of lowering the temperature to below 5 degrees Celsius and flushing the capillary with a fluid comprising no active etchant chemical.
21. A method of manufacturing a hollow-core photonic crystal fiber, comprising performing the method of any of clauses 1 to 20 to manufacture a plurality of capillaries around a hollow core to form a hollow-core photonic crystal fiber assembly.
22. A method as defined in clause 21, comprising, prior to performance of the etching, sealing at least one end each of the plurality of capillaries such that there is only a single etchant path with no etchant admitted into the capillaries.
23. A method as defined in clause 22, wherein the sealing comprises collapsing the ends of the capillaries at an end where the etchant is introduced into the hollow-core photonic crystal fiber assembly.
24. A method as defined in clause 22 or clause 23, further comprising:
   encasing the hollow-core photonic crystal fiber assembly in a gas cell; and
   introducing a gas medium within the gas cell.
25. A method as defined in any of clauses 22 to 24, further comprising collapsing the ends of the capillaries.
26. A method as defined in any of clauses 22 to 25, wherein the locally varying a control parameter comprises locally varying a control parameter to improve a local dispersion profile of the capillaries along their length for optimized supercontinuum generation from the hollow-core photonic crystal fiber.
27. A method of manufacturing a hollow-core photonic crystal fiber, the method comprising:
   manufacturing a plurality of capillaries around a hollow core to form a hollow-core photonic crystal fiber assembly;
   sealing at least one end of each of the plurality of capillaries; and
   introducing an etchant into the hollow-core photonic crystal fiber assembly to chemically etch the capillary walls and reduce their wall thickness, the etching being performed with only a single etchant path through hollow-core photonic crystal fiber assembly and no etchant admitted into the capillaries.
28. A method as defined in clause 27, wherein the sealing step comprises collapsing the ends of the capillaries at an end where the etchant is introduced into the hollow-core photonic crystal fiber assembly.
29. A method of manufacturing a hollow-core photonic crystal fiber, the method comprising:
   manufacturing a plurality of capillaries around a hollow core to form a hollow-core photonic crystal fiber assembly; and introducing an etchant into the hollow-core photonic crystal fiber assembly to chemically etch the capillary walls and reduce their wall thickness, the etching being performed in repeated cycles of low reactivity of the etchant and higher reactivity of the etchant.

30. A method as defined in clause 29, wherein the repeated cycles are controlled by repeated cycling of at least one control parameter between a value which results in low reactivity and a value which results in higher reactivity.

31. A method as defined in clause 29 or clause 30, wherein the control parameter comprises temperature.

32. A method as defined in any of clauses 29 to 31, the etchant is photo-sensitive and the varying of a control parameter comprises control of radiation intensity of an additional radiation source operable to illuminate the etchant.

33. A method as defined in any of clauses 29 to 32, wherein, for each cycle, the control parameter is maintained at the value which results in higher reactivity until the etchant is fully depleted.

34. A method as defined in any of clauses 29 to 33, wherein the etchant concentration is less than 0.5% of an active etchant chemical.

35. A method as defined in any of clauses 29 to 34, including initial and final steps of lowing the temperature to below 5 degrees Celsius and flushing the hollow-core photonic crystal fiber assembly with a fluid comprising no active etchant chemical.

36. A method as defined in any of clauses 29 to 35, comprising, prior to performance of the etching step, sealing at least one end each of the plurality of capillaries such that there is only a single etchant path with no etchant admitted into the capillaries.

37. A method as defined in clause 36, wherein the sealing step comprises collapsing the ends of the capillaries at an end where the etchant is introduced into the hollow-core photonic crystal fiber assembly.

38. An optical component, comprising:
    a hollow-core photonic crystal fiber, wherein the hollow-core photonic crystal fiber comprises a plurality of capillaries, the length of each of the capillaries comprising a first length portion having a first wall thickness and a second length portion having a second wall thickness,
    wherein the first length portion and the second length portion each have a substantially uniform inner capillary diameter.

39. An optical component as defined in clause 38, wherein the first length portion and the second length portion each have substantially the same inner capillary diameter 40. An optical component as defined in clause 38 or clause 39, wherein the second length portion corresponds to an inlet end of the hollow-core photonic crystal fiber for receiving pump radiation and the second wall thickness is thicker than the first wall thickness.

41. An optical component as defined in clause 40 wherein the first wall thickness is smaller than 100 nm and the second wall thickness is greater than 100 nm.

42. An optical component as defined in any of clauses 38 to 41, wherein the first wall thickness is such that resonant wavelengths of the capillary walls are at wavelengths having minimal impact on a broadband output of the optical component.

43. An optical component as defined in any of clauses 38 to 42, wherein the first length portion of the capillaries corresponds to a length of the hollow-core photonic crystal fiber prior to a location where a rapid broadening of the spectrum within the fiber occurs as a result of excitement by pump radiation and the second length portion of the capillaries corresponds to a length of the hollow-core photonic crystal fiber subsequent to the location where the rapid broadening of the spectrum within the fiber occurs as a result of excitement by pump radiation.

44. An optical component as defined in any of clauses 38 to 43, wherein the first length portion comprises 70% or more of the capillary length.

45. An optical component as defined in any of clauses 38 to 44, comprising a third length portion at one end of the capillary and a fourth length portion at the other end of the capillary, each of the third length portion fourth length portion comprising collapsed portions defining a tapered core region at each end of the of the hollow-core photonic crystal fiber, the tapered core region defining a comprising a region where a hollow core of the hollow-core photonic crystal fiber has an increasing diameter towards each end of the hollow-core photonic crystal fiber.

46. An optical component as defined in any of clauses 38 to 45, comprising:
    a gas cell encasing the hollow-core photonic crystal fiber; and
    a gas medium sealed within the gas cell.

47. An optical component comprising a plurality of capillaries, each manufactured according to the method of any of clauses 1 to 20.

48. A broadband radiation source device, being configured for generating a broadband output, the radiation source device comprising an optical component as defined in any of clauses 38 to 47.

49. A broadband radiation source device as defined clause 48, further comprising a pump laser for outputting a plurality of pump pulses to excite a gas medium contained within the hollow-core photonic crystal fiber for supercontinuum generation.

50. A broadband radiation source device as defined in clause 48 or clause 49, wherein the broadband output comprises a wavelength range of 200 nm to 2000 nm, or a sub-range within this range.

51. A metrology device comprising a broadband radiation source device as defined in any of clauses 48 to 50.

52. A metrology device as defined in clause 51, wherein the metrology device is operable as scatterometer metrology apparatus 53. A metrology device as defined in clause 51, wherein the metrology device is operable as a level sensor or an alignment sensor.

54. A lithographic apparatus comprising at least one the metrology device as defined in clause 53 for performing alignment and/or levelling metrology.

55. A lithographic cell comprising the lithographic apparatus of clause 53 and a metrology device as defined in clause 52.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A method for manufacturing a hollow-core photonic crystal fiber, the method comprising:
    obtaining a plurality of capillaries of the hollow-core photonic crystal fiber, a capillary of the plurality of capillaries having a capillary wall with a wall thickness;
    chemically etching the capillary wall to reduce the wall thickness of the capillary wall; and
    during performance of the etching, locally varying a control parameter along the length of the capillary, the control parameter relating to reactivity of an etchant used in the etching, so as to control the etched wall thickness of the capillary walls along the capillary length,
    wherein the length of each of the capillaries comprises a first length portion having a first wall thickness and a second length portion having a second, different wall thickness, and the first length portion and the second length portion each have a substantially uniform inner capillary cross-sectional dimension along its respective length.

2. The method as claimed in claim 1, wherein the varying of a control parameter comprises control of local temperature during the etching.

3. The method as claimed in claim 1, wherein the etchant is photo-sensitive and the varying of a control parameter comprises control of radiation intensity of a radiation source operable to illuminate the etchant.

4. The method as claimed in claim 1, comprising varying the control parameter in accordance with a control parameter profile, the control parameter profile defining an applied local value for the control parameter with respect to the capillary length.

5. The method as claimed in claim 1, wherein the varying of the control parameter comprises varying the control parameter to define a substantially uniform etched wall thickness over at least a portion of the capillary length.

6. The method as claimed in claim 1, wherein the varying of the control parameter comprises varying the control parameter to define a non-uniform etched wall thickness over the capillary length.

7. The method as claimed in claim 6, wherein the non-uniform etched wall thickness comprises the first wall thickness and the second wall thickness over.

8. A method of manufacturing a hollow-core photonic crystal fiber, the method comprising:
    performing the method of claim 1 to manufacture the plurality of capillaries around a hollow core to form a hollow-core photonic crystal fiber assembly.

9. The method as claimed in claim 8, wherein the locally varying a control parameter comprises locally varying a control parameter to improve a local dispersion profile of the capillaries along their length for optimized supercontinuum generation from the hollow-core photonic crystal fiber.

10. The method as defined in claim 8, comprising, prior to performance of the etching step, sealing at least one end each of the plurality of capillaries such that there is only a single etchant path with no etchant admitted into the capillaries.

11. An optical component, comprising:
    a hollow-core photonic crystal fiber comprising a plurality of capillaries, the length of each of the capillaries comprising a first length portion having a first wall thickness and a second length portion having a second, different wall thickness,
    wherein the first length portion and the second length portion each have a substantially uniform inner capillary cross-sectional dimension along its respective length.

12. The optical component as claimed in claim 11, wherein the first length portion and the second length portion each have substantially the same inner capillary cross-sectional dimension along their lengths.

13. The optical component as claimed in claim 11, wherein the second length portion corresponds to an inlet end of the hollow-core photonic crystal fiber for receiving pump radiation and the second wall thickness is thicker than the first wall thickness.

14. The optical component as claimed in claim 11, wherein the first wall thickness is such that resonant wavelengths of the capillary walls are at wavelengths having minimal impact on a broadband output of the optical component.

15. The optical component as claimed in claim 11, wherein the first length portion of the capillaries corresponds to a length of the hollow-core photonic crystal fiber prior to a location where a rapid broadening of the spectrum within the fiber occurs as a result of excitement by pump radiation and the second length portion of the capillaries corresponds to a length of the hollow-core photonic crystal fiber subsequent to the location where the rapid broadening of the spectrum within the fiber occurs as a result of excitement by pump radiation.

16. The optical component as claimed in claim 11, wherein the first length portion comprises 70% or more of the capillary length.

17. The optical component as claimed in claim 11, comprising a third length portion at one end of the capillaries and a fourth length portion at the other end of the capillaries, each of the third length portion and fourth length portion comprising collapsed portions defining a tapered core region at each end of the of the hollow-core photonic crystal fiber, the tapered core region defining a region where a hollow core of the hollow-core photonic crystal fiber has an increasing cross-sectional dimension towards each end of the hollow-core photonic crystal fiber.

18. The optical component as claimed in claim 11, comprising:
    a gas cell encasing the hollow-core photonic crystal fiber; and
    a gas medium sealed within the gas cell.

19. A broadband radiation source device configured to generate a broadband output, the radiation source device comprising the optical component as claimed in claim 11.

20. A metrology device comprising:
the broadband radiation source device as claimed in claim 19; and
a detector.

* * * * *